United States Patent

[11] 3,587,214

| [72] | Inventors | Harold A. Willett;<br>Jacob A. Giardina, Thibodaux, La. |
|---|---|---|
| [21] | Appl. No. | 60,535 |
| [22] | Filed | Aug. 3, 1970 |
| [45] | Patented | June 28, 1971 |
| [73] | Assignee | Cane Machinery & Engineering Co., Inc.,<br>Thibodaux, La. |

[54] SUGAR CANE HARVESTER
7 Claims, 6 Drawing Figs.

[52] U.S. Cl. .................................................. 56/10.7, 56/13.8
[51] Int. Cl. ........................................................ A01d 45/10
[50] Field of Search ........................................ 56/15, 16, 17, 18, 102, 103, 119, 229, 231, 232, 327

[56] References Cited
UNITED STATES PATENTS

| 1,901,099 | 3/1933 | Hale | 56/102 |
| 1,975,089 | 10/1934 | Falkiner et al. | 56/17 |
| 2,709,326 | 5/1955 | Coombe | 56/229 |
| 3,002,330 | 10/1961 | Thomson | 56/17 |
| 3,103,091 | 9/1963 | Duncan et al. | 56/16 |
| 3,421,303 | 1/1969 | Kammerzell | 56/229 |

*Primary Examiner*—Antonio F. Guida
*Attorney*—Wilkinson, Mawhinney and Theibault ABSTRACT: The present disclosure is directed to a sugar cane harvester of the V-cutter type which may cut at least two rows of cane simultaneously and in which each leg of the V has static blades and a rotary cutter. A parting cutter is mounted at the apex of the V to cut vertically. The V-cutter is pivotally mounted to the front of the mobile frame and the working depth is controlled by a guage wheel.

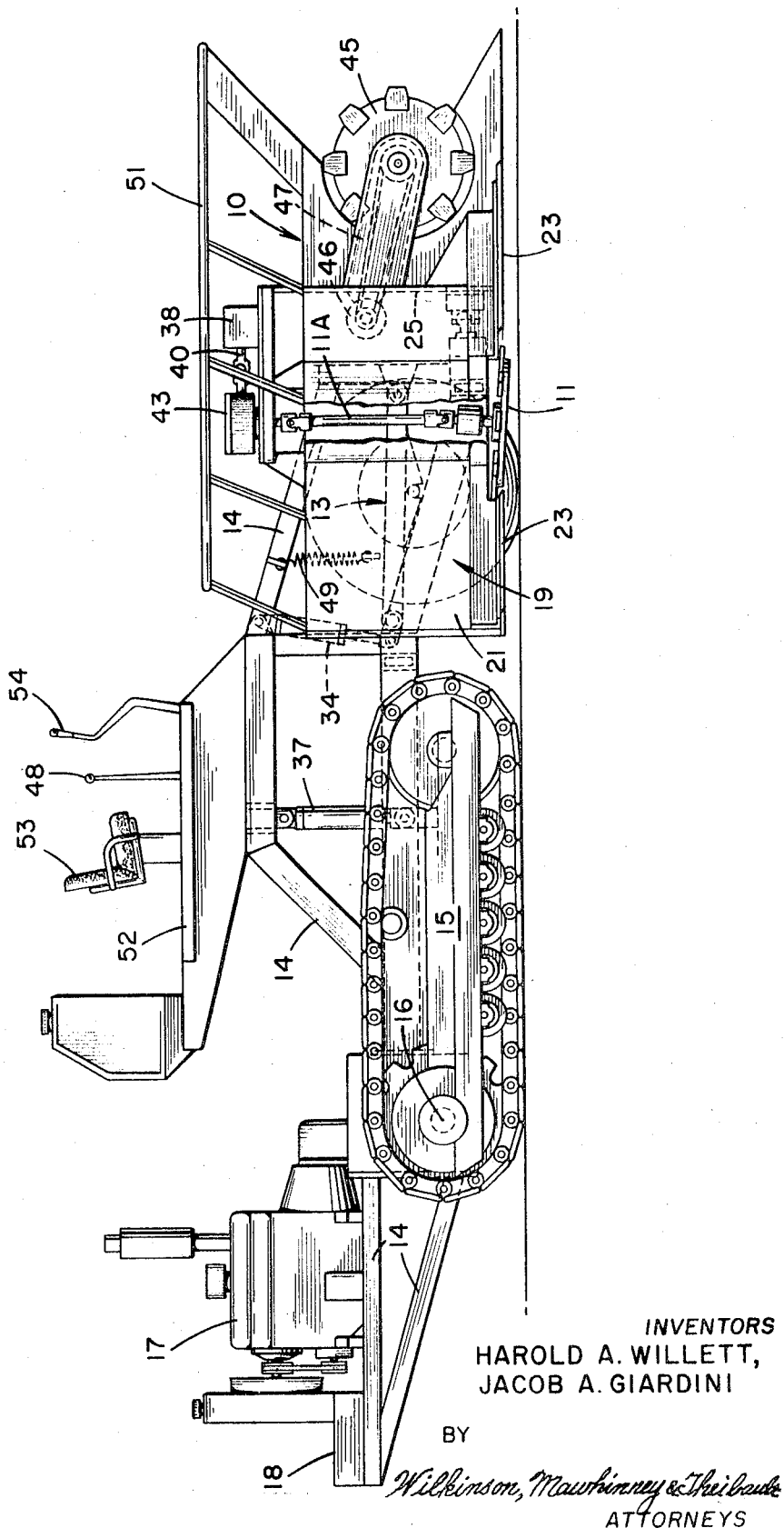

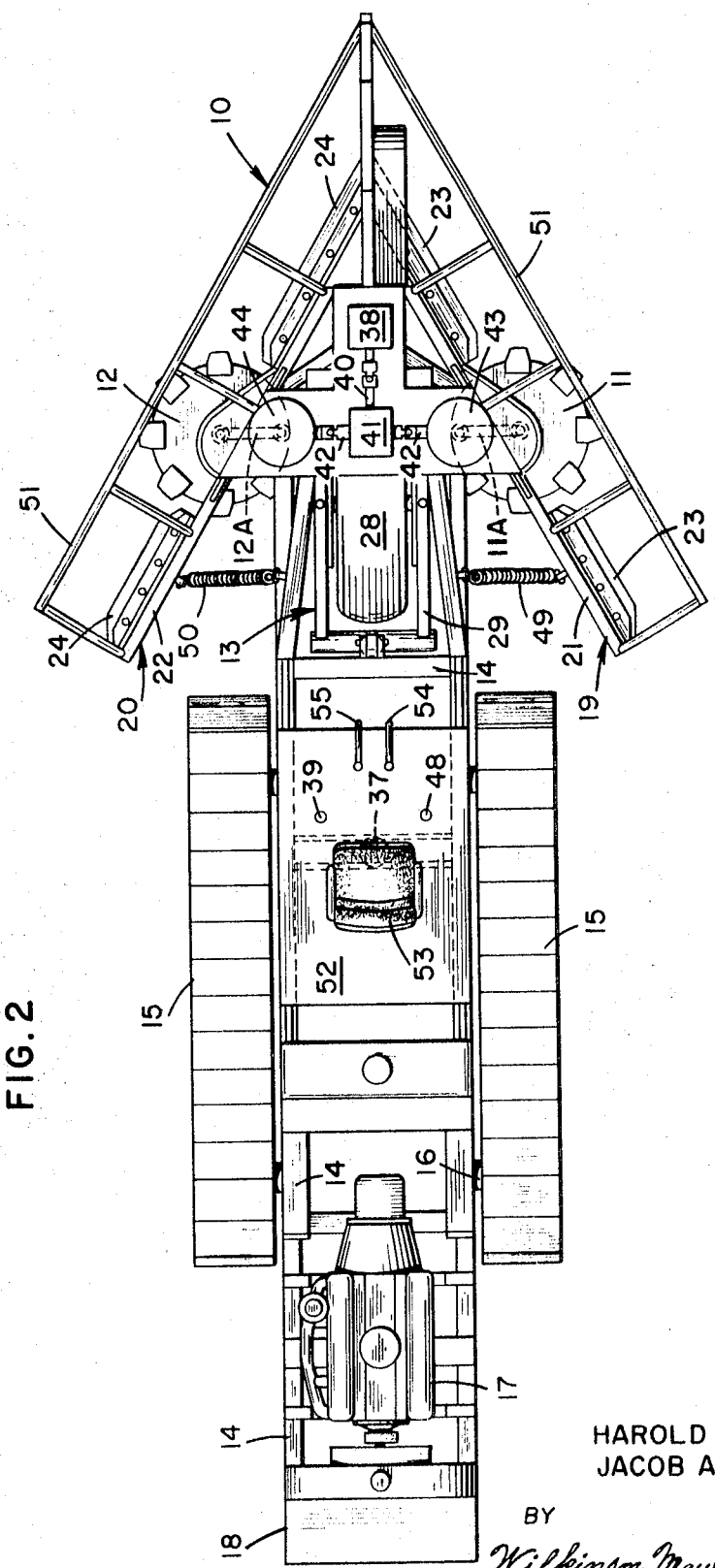

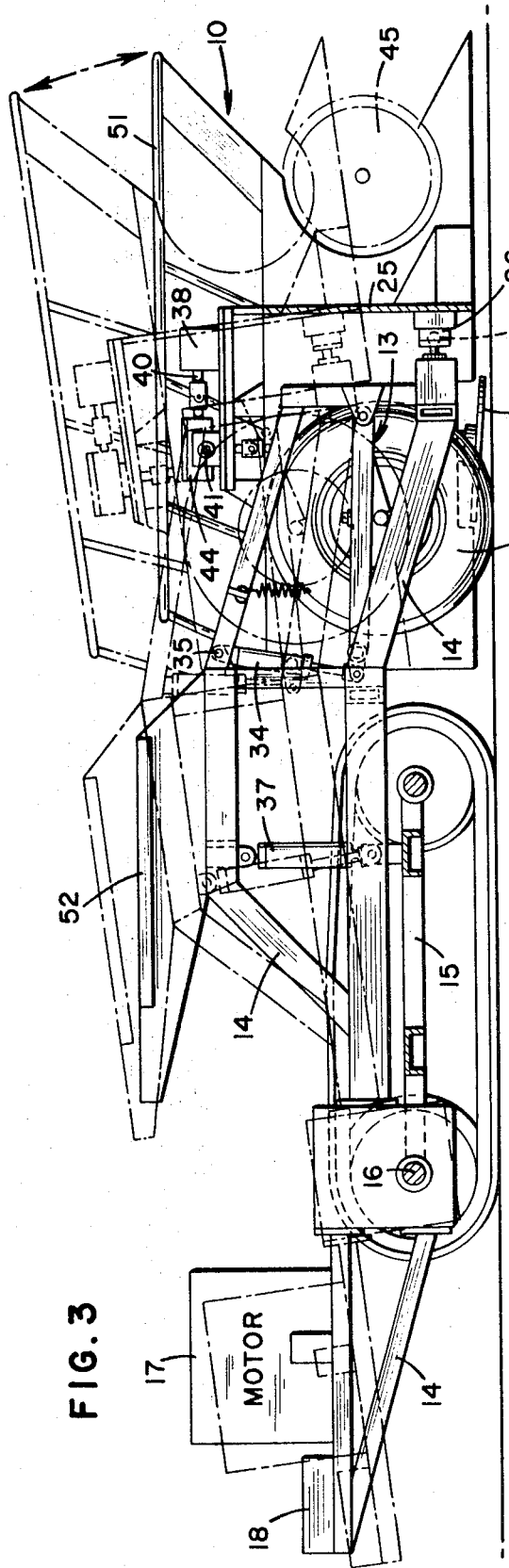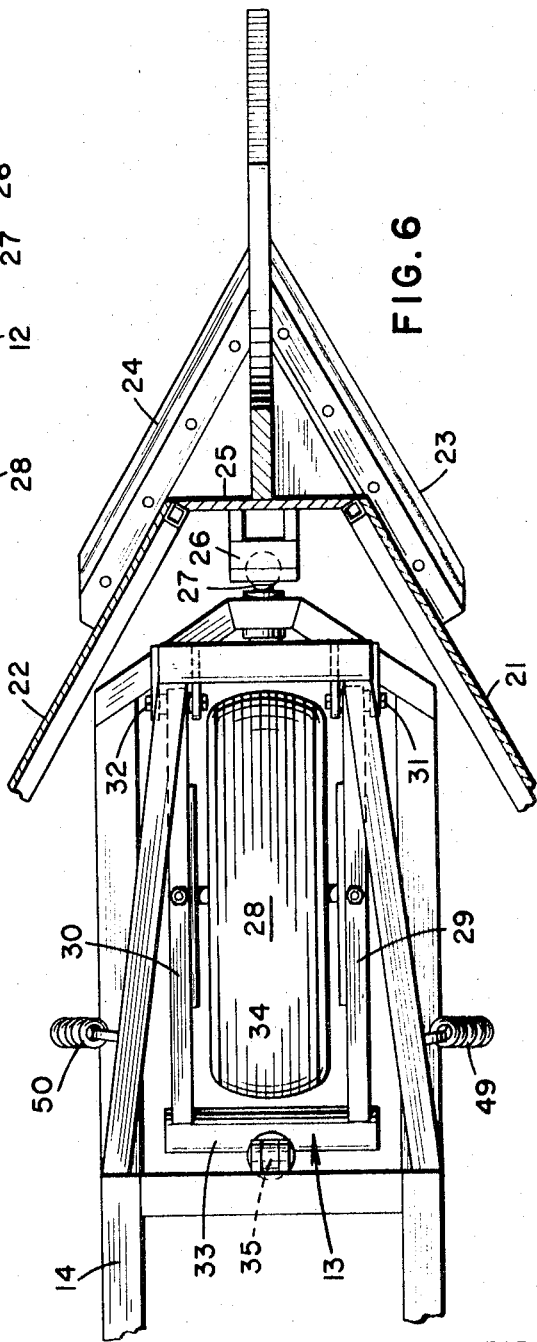

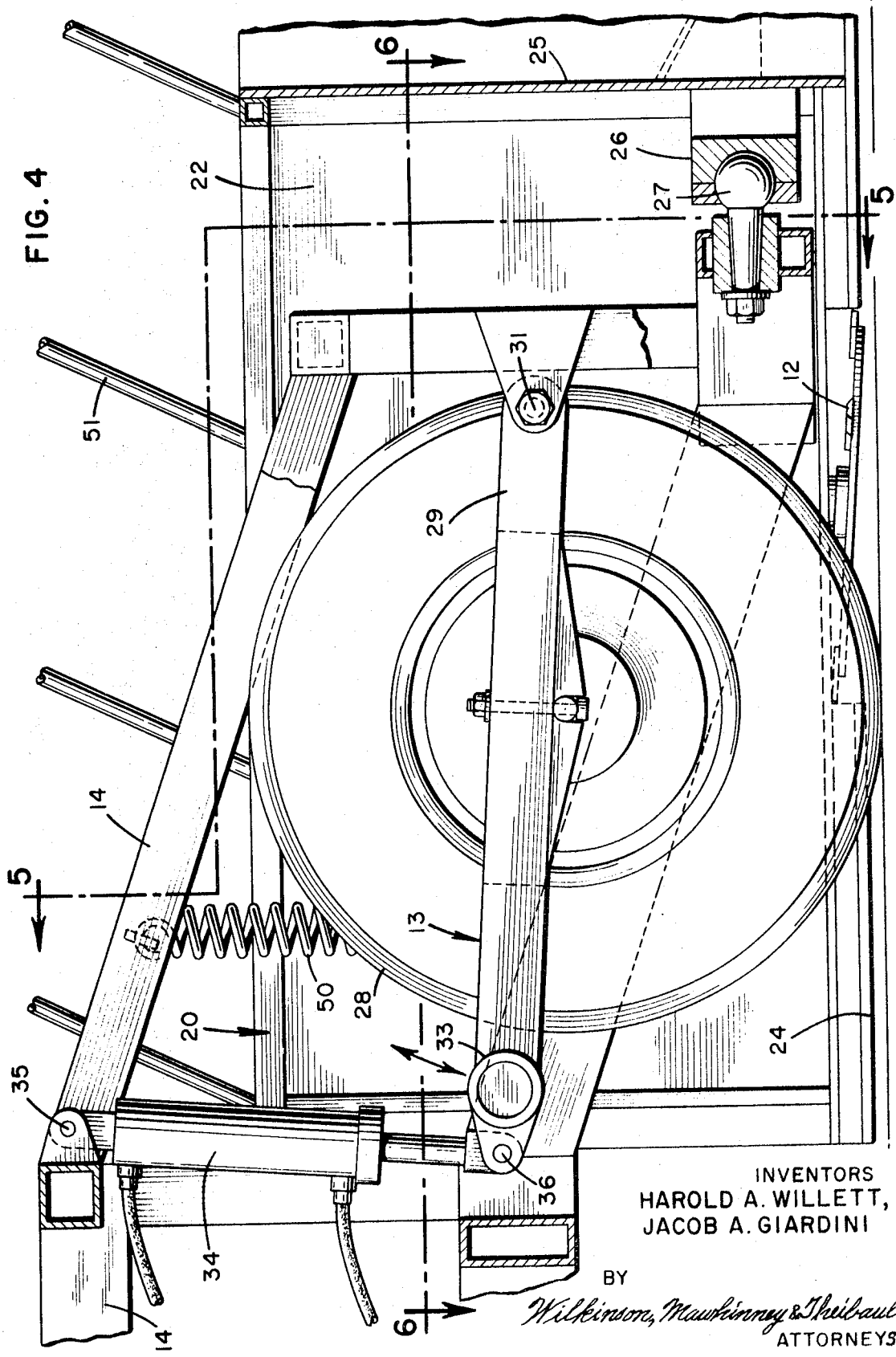

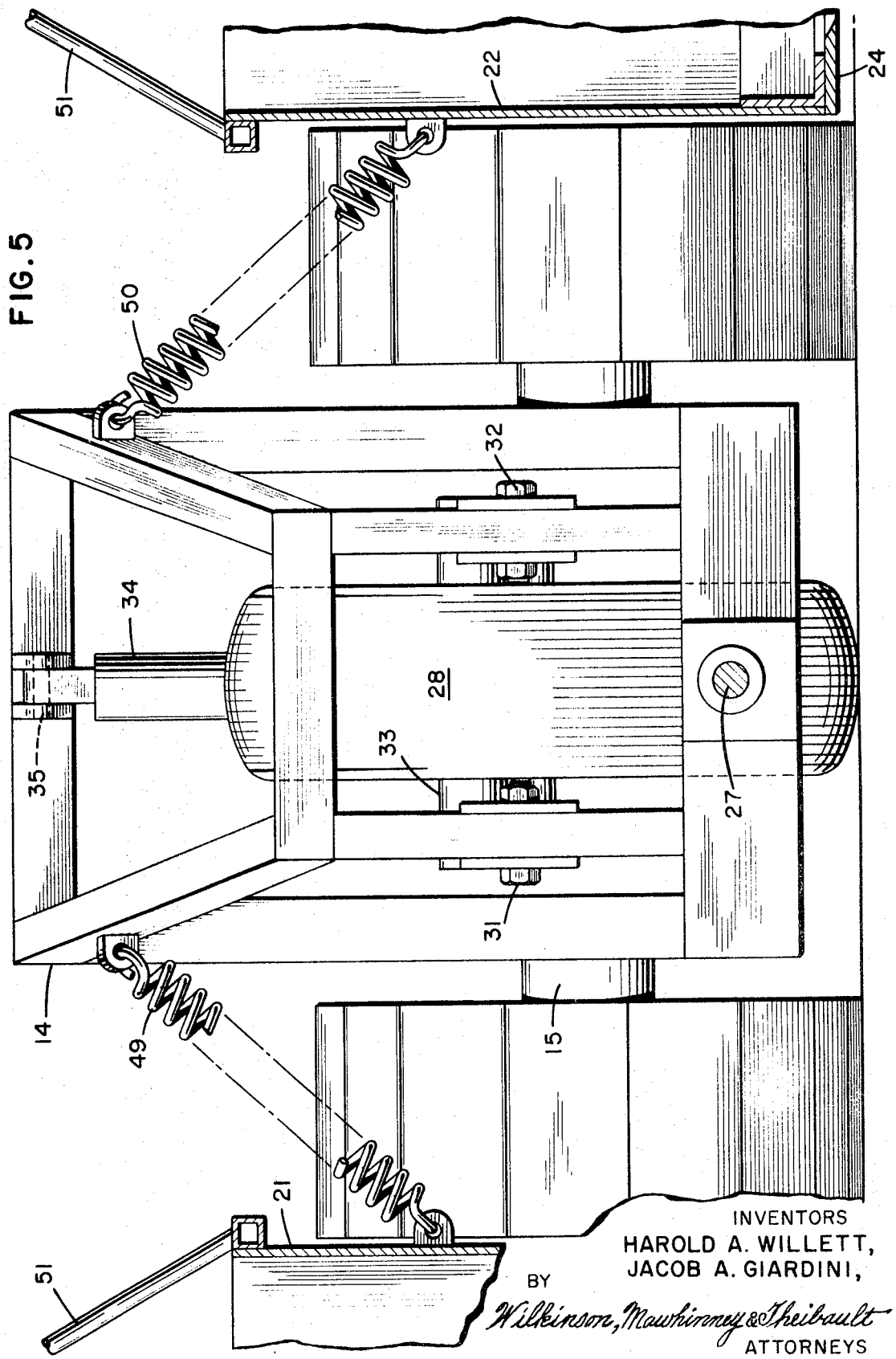

SUGAR CANE HARVESTER

An object of the present invention is the provision of a V-cutter for harvesting sugar cane which may be pivotally connected to the front of a tractor of the crawler type or other self propelled mobile frame and which has legs each of which has a static horizontally disposed cane cutting blade at its base and a vertical wall upstanding therefrom and between the front and rear of each leg is mounted a rotary blade with its plane of cut substantially in the plane of the static blade. Each leg is joined at its front to define substantially a V or wedge shaped cutter.

Another object of the present invention is the provision of a mounting frame for the cutter which may be pivotally connected to the tractor for up and down movement which frame has a gauge wheel for supporting the frame and the V-cutter and which through a hydraulic cylinder and ram will either raise or lower the plane of the static and rotary cane cutters relative to the ground.

A still further object of the present invention is the provision of a simple compact V-cutter unit which may be attached to a conventional crawler tractor and its drive supplied from the hydraulic pump on the tractor.

With the foregoing and other objects in view, the invention will be more full described hereinafter, and will be more particularly pointed out in the claims appended hereto.

In the drawings wherein like symbols refer to like or corresponding parts throughout the several views:

FIG. 1 is a side elevational view of the V-cutter of the present invention shown mounted on a crawler tractor unit.

FIG. 2 is a top plan view of the V-cutter and tractor of FIG. 1.

FIG. 3 is a schematic mechanical view of the V-cutter and its mounting to the crawler frame shown in solid lines in the cutting position and in broken lines in the transport position.

FIG. 4 is a fragmentary view of the V-cutter mount to the main frame and the gauge wheel mount taken at an enlarged scale.

FIG. 5 is a transverse vertical section taken on the lines 5–5 in FIG. 4.

FIG. 6 is a sectional view taken on line 6–6 of FIG. 4.

Referring now to FIGS. 1 and 2, 10 designates generally a V-cutter having horizontal rotary cutters 11 and 12, one mounted on each leg of the V-shape. The V-cutter 10 is swively connected to a gauge frame 13 which is pivoted to a main frame 14 carried on a crawler frame 15 and pivoting thereabout at 16. The crawler unit 15 receives its motive power from an engine 17 carried on the main frame 14.

The V-cutter has two legs 19 and 20 which have vertical plates 21, 22 upstanding from static cutter blades 23, 24 each of which has a knife edge extending horizontally. The horizontal rotary cutters 11 and 12, as best seen in FIG. 2, lie substantially in the middle of each static blade 23, 24. An attaching plate 25, secured to each leg of the V carries secured thereto a socket mount 26 into which is received a complemental ball 27 secured to gauge frame 13, A gauge wheel 28 is rotatably mounted between a pair of arms 29, 30 which are pivotally connected to the main frame 14 at 31, 32, see FIGS. 4 and 6, at their front end and secured to tube 33 at their rear end. The arms 29, 30 and their captive gauge wheel 28 are moved in the direction of the arrow by cylinder and ram unit 34, one end of which is secured to the main frame at 35 and the other end of which is secured to the tube 33 at 36. The main frame 14 pivots about the crawler frame 15 at 16 and is connected to the crawler unit forwardly of the pivot 16 by a hydraulic cylinder and ram unit 37 to permit rocking of the main frame 14 relative to the crawler frame 15 independent of the position of the gauge wheel 28, that is whether it is raised or lowered.

Mounted at the top of the V-frame, as best seen in FIGS. 1 and 2, is a hydraulic motor 38 which receives its motive fluid from the hydraulic plant driven by engine 17 and is under control of valve 39 for driving the cutters 11 and 12 through shaft 40, right angle gear box 41, shafts 42, gear boxes 43, 44 and shafts 11A and 12A. The drive shafts are fitted with single and double universal joints where necessary.

Carried at the apex of the V-cutter is a parting cutter disc 45 positioned with its axis of cut in a vertical plane, as best seen in FIG. 1. This cutter 45 is driven by hydraulic motor 46 and chain 47 under the control of valve 48.

Because of the ball and socket mounting of the V-cutter stabilizing springs 49, 50 are secured between the main frame 14 and the V-frame, as best seen in FIG. 5, so that the V-cutter unit floats in a horizontally stable attitude which may be raised or lowered by cylinder unit 34 which will either raise or lower the gauge wheel into or out of contact with the ground to control the plane of cut of rotary cutters 11 and 12 depending upon cane plant and culture.

A protective guard rail above the top of the vertical plates 21, 22 is shown at 51 in the form of piping welded to the top of plates 21, 22 and being directed forwardly at its top portion to keep the cane stalks and foliage from getting behind the plates and interfering with the drives of either the V-cutter or the crawler unit.

Mounted on top of the main frame 14 is an operator's platform 52 having a seat 53, controls for valves 39 and 48 as well as controls 54, 55 for the crawler units to propel and steer the tractor upon which the V-cutter may be mounted.

The V-cutter may be mounted on any type of mobile frame having a prime mover and hydraulic plant to supply sufficient motive fluid to operate the cutter discs and the raising and lowering cylinder and ram units.

When the V-cutter is employed with a crawler unit having a main frame pivoted to it as in FIGS. 1 through 3 it is not necessary to have a counterweight 18 at the rear of the main frame to help compensate for the weight of the V-cutter mounted on the front of the frame, since the engine acts as a counterweight.

With the engine 17 being rearwardly mounted, both the radiator and the engine is in a cleaner working atmosphere. For example, in the case of the standard Hawaiian V-Cutter, the V Blade is adapted to the front of a standard crawler tractor with the engine in its normal position. In doing so, an excessive amount of overheating trouble resulted because of the radiator being constantly plugged with trash. Also, cane trash collects in the belly pan of the tractor and becomes a fire hazard. By mounting the engine and radiator rearwardly on the tractor, we not only let the engine serve as counterweight, but we eliminate the overheating problem and the potential fire hazard.

In use the V-cutter acts as a wedge, the apex of which is directed between two rows of standing or growing cane such that the base of the cane stalks proximate their attachment to the earth, each row is positioned to be engaged by the rotary cutters 11 and 12 for simultaneously cutting two rows of cane. The angular positioning of the walls or vertical plates 21, 22 is to provide a wedging or caming action to engage the stalks which may be recumbent, elevate the free end to permit the cutter to have access to the stalk base and to doze the cut stalks in a direction away from the unit into windrows of cut cane. Additional wings may be added to the trailing edges of the V-shape to direct cut cane for example into 4-row heaps. These wings may be folded back out of the way along the side of the crawler unit when not used and may be hydraulically controlled between their in and out position.

The harvester operator may raise or lower the point of cut on the cane stalks by cutters 11 and 12 with raising and lowering of the gauge wheel as described hereinbefore. When moving the crawler unit from the service area to the field for cutting cane the main frame 14 is raised to the chain line position of FIG. 3 so that the V-cutter and its gauge wheel 28 are out of contact with the ground and the unit travels on the crawlers.

We claim:
1. For use with a self propelled mobile frame:
 a. a V-shaped sugar cane cutter frame adapted to be mounted on the leading end of the mobile frame with the apex of the V leading and each leg of the V being directed to each side of the mobile frame and a knife edge blade at the base of each leg of the V-shape with its cutting edges directed horizontally, b. a pair of horizontal rotary cutters carried by said V-sahped cutter with their plane of cut lying substantially horizontal and parallel to the base of each leg of the V-shape and one of each rotary cutters lying in the plane of cut of each leg, c. means connected to each rotary cutter for rotating same, and d. means connected between the mobile frame and said V-shaped cutter frame for causing raising and lowering of the cutters relative to the ground.

2. A sugar cane harvester as claimed in claim 1 wherein said means connected between the mobile frame and V-shaped cutter frame is a subframe pivoted to the mobile frame at its rear and having a gauge wheel at its front with a hydraulic cylinder and ram between the pivot point of the subframe to the main frame and the gauge wheel.

3. A sugar cane harvester as claimed in claim 1 wherein the horizontal rotary cutters carried by the V-shaped cutter frame have tilt angle adjustments which permit setting of the horizontal rotary cutters to compensate for different cultures of sugar cane.

4. A sugar cane harvester as claimed in claim 1 wherein each leg of the V of said V-shaped cutter frame has a substantially flat wall upstanding from the cutter blades.

5. A sugar cane harvester as claimed in claim 1 wherein said means connected to rotate each cutter is a hydraulic motor adapted to receive its motive fluid from the prime mover on the mobile frame.

6. A V-shaped sugar cane cutter as claimed in claim 1 further comprising:

e. a vertically positioned parting rotary cutter carried by said V-shaped cutter frame with its axis of rotation being at substantially a right angle to the pair of rotary cutters and being at the apex of the V.

7. A sugar cane harvester as claimed in claim 1 wherein the mobile frame comprises a crawler unit, a longitudinal frame extending forwardly and rearwardly of the crawler unit and being pivoted to the rear of the crawler for up and down movement, and an engine for driving the harvester is mounted on said longitudinal frame rearwardly of the pivot between said frame and crawler unit so that the weight of the engine counterbalances the weight of the V-shaped sugar cane cutter on the leading end of the frame and the engine is protected from overheating and fire by shielding it from foliage on the sugar cane stalks.